US008024794B1

(12) United States Patent
Feldman et al.

(10) Patent No.: US 8,024,794 B1
(45) Date of Patent: Sep. 20, 2011

(54) DYNAMIC ROLE BASED AUTHORIZATION SYSTEM AND METHOD

(75) Inventors: Samuel Feldman, Cupertino, CA (US); Ming Ho, San Jose, CA (US)

(73) Assignee: Amdocs Software Systems Limited, Dublin (IE)

( * ) Notice: Subject to any disclaimer, the term of this patent is extended or adjusted under 35 U.S.C. 154(b) by 1015 days.

(21) Appl. No.: 11/292,030

(22) Filed: Nov. 30, 2005

(51) Int. Cl.
*G06F 7/04* (2006.01)
*G06F 3/00* (2006.01)
*G06F 17/00* (2006.01)
*G06K 5/00* (2006.01)

(52) U.S. Cl. ......... 726/21; 715/741; 235/382; 700/237
(58) Field of Classification Search ............... 726/21, 726/2; 715/741; 235/382; 700/237
See application file for complete search history.

(56) References Cited

U.S. PATENT DOCUMENTS

| 5,768,519 | A   | * | 6/1998  | Swift et al. ............... 709/223 |
|-----------|-----|---|---------|--------------------------------------|
| 6,182,142 | B1  | * | 1/2001  | Win et al. ................ 709/229 |
| 6,453,353 | B1  | * | 9/2002  | Win et al. ................ 709/229 |
| 6,961,687 | B1  | * | 11/2005 | Myers et al. ............... 703/6   |
| 7,010,600 | B1  | * | 3/2006  | Prasad et al. .............. 709/225 |
| 7,013,485 | B2  | * | 3/2006  | Brown et al. ............... 726/27  |
| 7,039,917 | B2  | * | 5/2006  | Lister et al. ............... 718/107 |
| 7,171,411 | B1  | * | 1/2007  | Lewis et al. ................ 707/9  |
| 7,318,237 | B2  | * | 1/2008  | Moriconi et al. ............. 726/27 |
| 7,451,149 | B2  | * | 11/2008 | Lee et al. ................... 707/9 |
| 7,463,637 | B2  | * | 12/2008 | Bou-Diab et al. ............ 370/401 |
| 2001/0056494 | A1 | * | 12/2001 | Trabelsi .................... 709/229 |
| 2003/0018696 | A1 | * | 1/2003  | Sanchez et al. .............. 709/201 |
| 2003/0087629 | A1 | * | 5/2003  | Juitt et al. .................. 455/411 |
| 2004/0042470 | A1 | * | 3/2004  | Cooper et al. ............... 370/401 |
| 2004/0093526 | A1 | * | 5/2004  | Hirsch ....................... 713/202 |
| 2004/0117358 | A1 |   | 6/2004  | von Kaenel et al. ........... 707/3  |
| 2004/0122946 | A1 | * | 6/2004  | Hu et al. .................... 709/225 |
| 2004/0128559 | A1 | * | 7/2004  | Zurko et al. ................ 713/202 |
| 2004/0243822 | A1 | * | 12/2004 | Buchholz et al. ............. 713/200 |
| 2005/0102536 | A1 | * | 5/2005  | Patrick et al. ............... 713/201 |
| 2006/0026159 | A1 | * | 2/2006  | Dettinger et al. .............. 707/9 |
| 2006/0080352 | A1 | * | 4/2006  | Boubez et al. ............... 707/102 |
| 2006/0117390 | A1 | * | 6/2006  | Shrivastava et al. ........... 726/27 |
| 2006/0218394 | A1 | * | 9/2006  | Yang ......................... 713/167 |
| 2007/0056040 | A1 | * | 3/2007  | Van Den Heuvel et al. .... 726/26 |
| 2008/0244706 | A1 | * | 10/2008 | Lenoir et al. ................ 726/4  |

OTHER PUBLICATIONS

Kille, S. "Representing the O/R address hierarchy in the X.500 directory information tree" Isode Ltd. Mar. 1998.

* cited by examiner

*Primary Examiner* — Techane Gergiso
(74) *Attorney, Agent, or Firm* — Zilka-Kotab, PC

(57) ABSTRACT

A system, method and computer program product are provided for role based authorization. Included is a plurality of resources and roles associated with an authorization domain. In use, access to the resources is controlled utilizing expressions that operate as a function of the roles and the resources.

20 Claims, 7 Drawing Sheets

FIGURE 7

DYNAMIC ROLE BASED AUTHORIZATION SYSTEM AND METHOD

FIELD OF THE INVENTION

The present invention relates to authorization systems, and more particularly, to authorizing access to various resources.

BACKGROUND

With the advent of general access computer networks, such as the Internet, people now have ready access to various computing and/or networking resources. Unfortunately, some people have taken advantage of such easy access, thus requiring the development of various authorization systems for authorizing resource access.

Various techniques are employed by such authorization systems. For example, some systems define an access control query, which uses a data path mechanism to dynamically create additional filter criteria to attach to a target query. As yet another example, traditional systems have also defined protection mechanism using hard-coded logic (e.g. one for protecting an account, one for sales opportunities, etc.), where restrictions are built directly into each operation or query to be protected.

Still yet, additional systems replicate relevant relational application data into an external security system. Such security system may take the form of an LDAP repository with a security framework such as a Java authentication and authorization system (JAAS), etc. As still yet another example, other systems have been developed which run a security check to disable an access button or the like for each protected resource. Still other systems trap a security check from a JAAS or the like, and run a query to check permissions.

Unfortunately, the foregoing techniques are plagued with drawbacks such as a lack of performance or effectiveness, possibly including, but not limited to a lack of ability to define new authorization roles during operation, a lack of ability to assign permissions dynamically during operation, etc.

There is thus a need for overcoming these and/or other problems associated with the prior art.

SUMMARY

A system, method and computer program product are provided for role based authorization. Included is a plurality of resources and roles associated with an authorization domain. In use, access to the resources is controlled utilizing expressions that operate as a function of the roles and the resources.

BRIEF DESCRIPTION OF THE DRAWINGS

FIG. 7 shows a graphical user interface for generating a team authorization matrix, in accordance with another embodiment.

DETAILED DESCRIPTION

Figure 1:
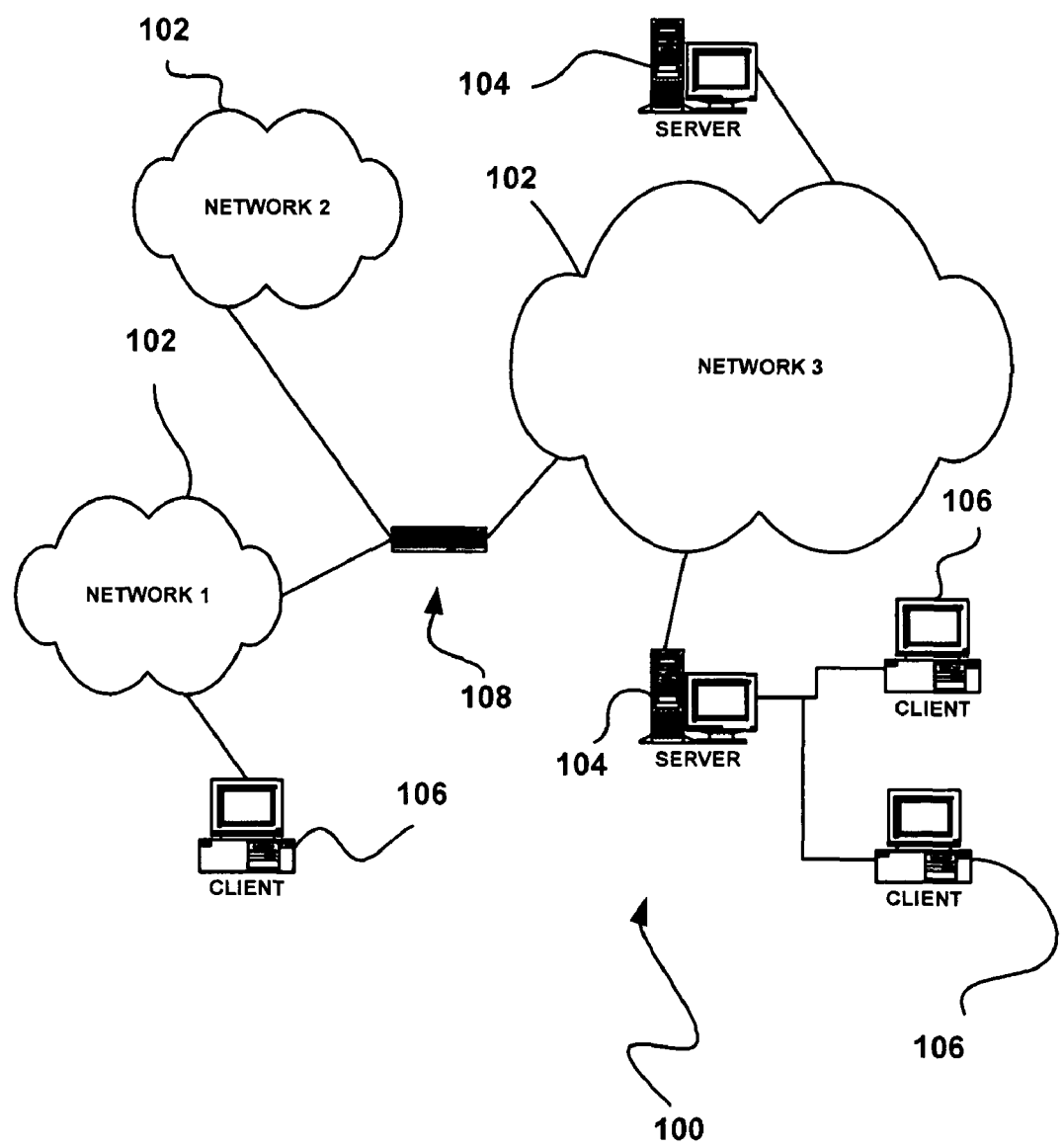
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), wireless network, wide area network (WAN) such as the Internet, etc.

Coupled to the networks 102 are server computers 104 which are capable of communicating over the networks 102. Also coupled to the networks 102 and the server computers 104 is a plurality of client computers 106. Such client computers 106 may each include a desktop computer, lap-top computer, hand-held computer, mobile phone, hand-held computer, personal video recorder (PVR), a digital media [e.g. compact disc (CD), digital video disc (DVD), MP3, etc.] player, printer, and/or any other type of logic. In order to facilitate communication among the networks 102, at least one gateway or router 108 is optionally coupled therebetween.

Figure 2:
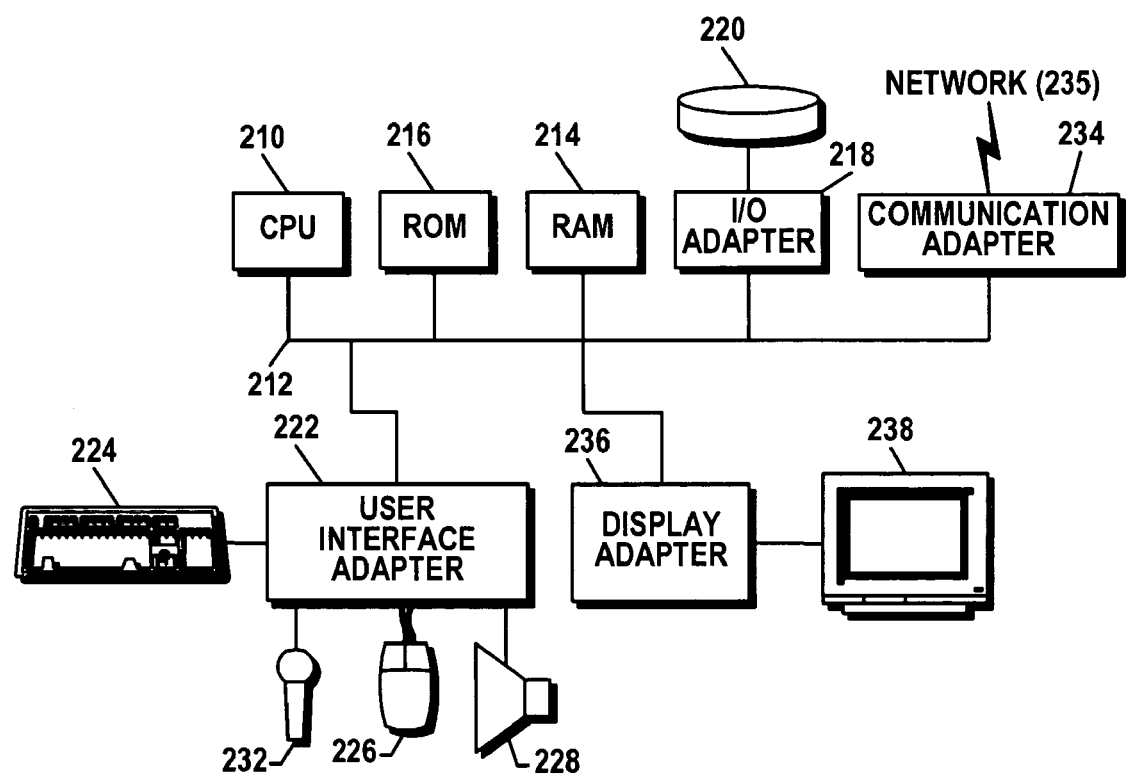
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a possible hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
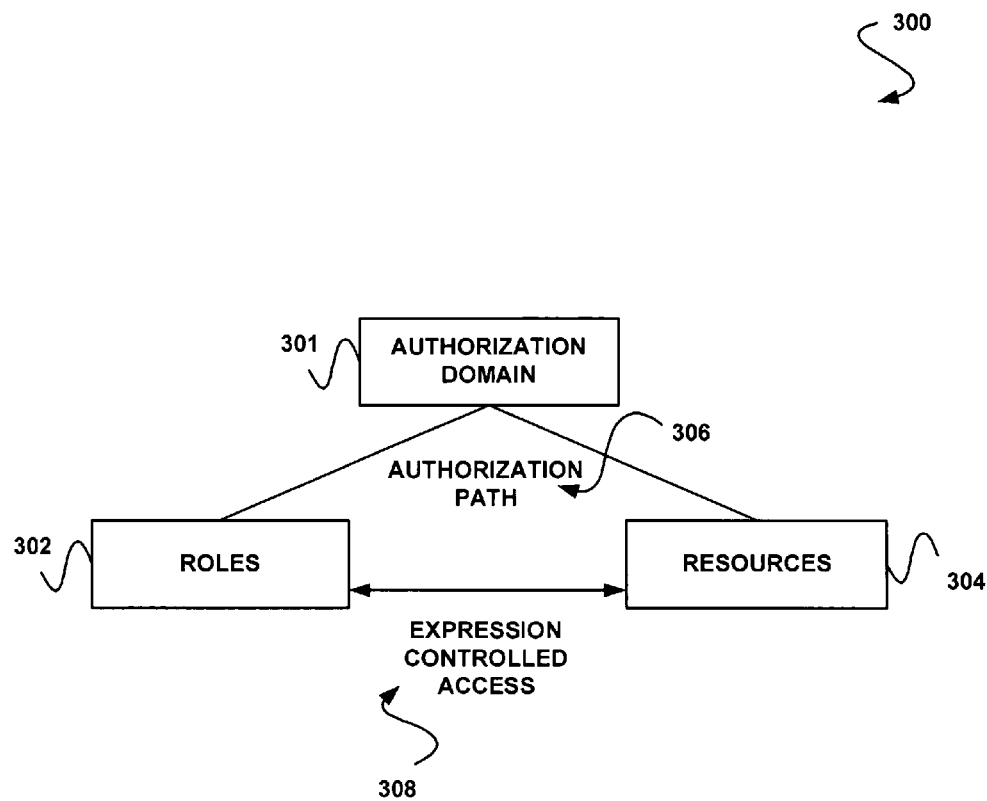
FIG. 3 shows a framework for role based authorization, in accordance with one embodiment.

FIG. 3 shows a framework 300 for role based authorization, in accordance with one embodiment. As an option, the present framework 300 may be implemented in the context of the architecture and environment of FIGS. 1 and/or 2. Of course, however, the framework 300 may be carried out in any desired environment.

As shown, included is a plurality of resources 304 and roles 302 associated with an authorization domain 301. In the context of the present description, the resources 304 refer to computer functions and/or data (e.g. software, etc.), as well as any hardware or components thereof. Examples of such functionality and/or data may include, but is not limited to run-time data, reference data, processes, status transitions, operations, etc. Of course, however, any resources 304 are envisioned to which access is desired.

In one embodiment, such computer functions and/or data may further involve a customer relationship management (CRM) application and/or any component thereof. For example, the foregoing data may include a list of information, such as a list of accounts. In one optional embodiment, such resources may include information to be filtered, or actions to be disabled. For instance, data restriction may optionally be involved including filtering the list, such that a user cannot even see restricted items in the list, in a manner that will soon become apparent.

Further in the context of the present description, the roles 302 may include user roles [where users have been assigned a preferential relationship to specific data objects (the authorization domain 301), etc.], team roles assigned to teams [e.g. groups of users, etc. which are then associated with a specific data object (the authorization domain 301), etc.], global roles assigned to users on a global basis (e.g. not having a preferential relationship to specific data objects, etc.), and/or any other roles capable of being assigned to one or more users so that access to desired resources 304 may be afforded, as a function thereof. In still further embodiments, the roles 302 may include a plurality of permissions and/or restrictions that apply to a group of users.

Still yet, the authorization domain 301 may include any root entity that derives protection via any authorization associated with the access to the resources 304. Again, in the context of the exemplary embodiment where the resources 304 include the CRM application, the authorization domain 301 may include a customer and/or account associated therewith. Further, such root entity may possibly refer to the data concept from which authorization is derived. For example, it answers the questions: "What concept relates the user to the restricted resource?"

As shown, the resources 304 may be linked to the authorization domain 301 utilizing an authorization path 306. Such authorization path 306 may include any data structure and/or code capable of establishing a relationship between the resources 304 and roles 302, and the authorization domain 301.

In use, access to the resources 304 is controlled utilizing expressions 308 that operate as a function of the roles 302 and the resources 304. Such expressions 308 may be user-configurable, reusable, updateable, administratable in real-time while a system is running, etc. For example, the expressions 308 may be defined utilizing a graphical user interface, etc., and further named or otherwise identified, so that they can be reused in different instances (e.g. with different resources, authorization domains, and/or even other expressions, etc.). In use, the aforementioned control may be carried out reactively, proactively, instantaneously, etc., using the expressions 308.

The instant expressions 308 may optionally be defined by an administrator or developer, and further be used at run-time to dynamically generate an optimized well-performing query. Such query generation may further make use of dynamic relational information that exists in many customer databases.

Operation may further be enhanced by the expressions 308 optionally including conditions under which access to the resources 304 is allowed or not. For example, in one optional embodiment, the expressions 308 may include a Boolean or arithmetic expression that operates as a function of a name, parameter, and/or any other aspect associated with the resources 304 and/or rules 302. In various additional embodiments, the expressions 308 may further operate as a function of information available in a run-time context (e.g. user information, business state, information received from external sources, etc.), in addition to the resources 304 and/or rules 302. Of course, unconditional access or blocking is also contemplated.

More illustrative information will now be set forth regarding various optional architectures and features with which the foregoing technique may or may not be implemented, per the desires of the user. For example, the various following optional functionality is set forth in the context of a CRM application.

It should be strongly noted that the following information is set forth for illustrative purposes and should not be construed as limiting in any manner. Any of the following features may be optionally incorporated with or without the exclusion of other features described. Further, the following to-be-described features may also be incorporated outside the context of a CRM application.

Figure 4:
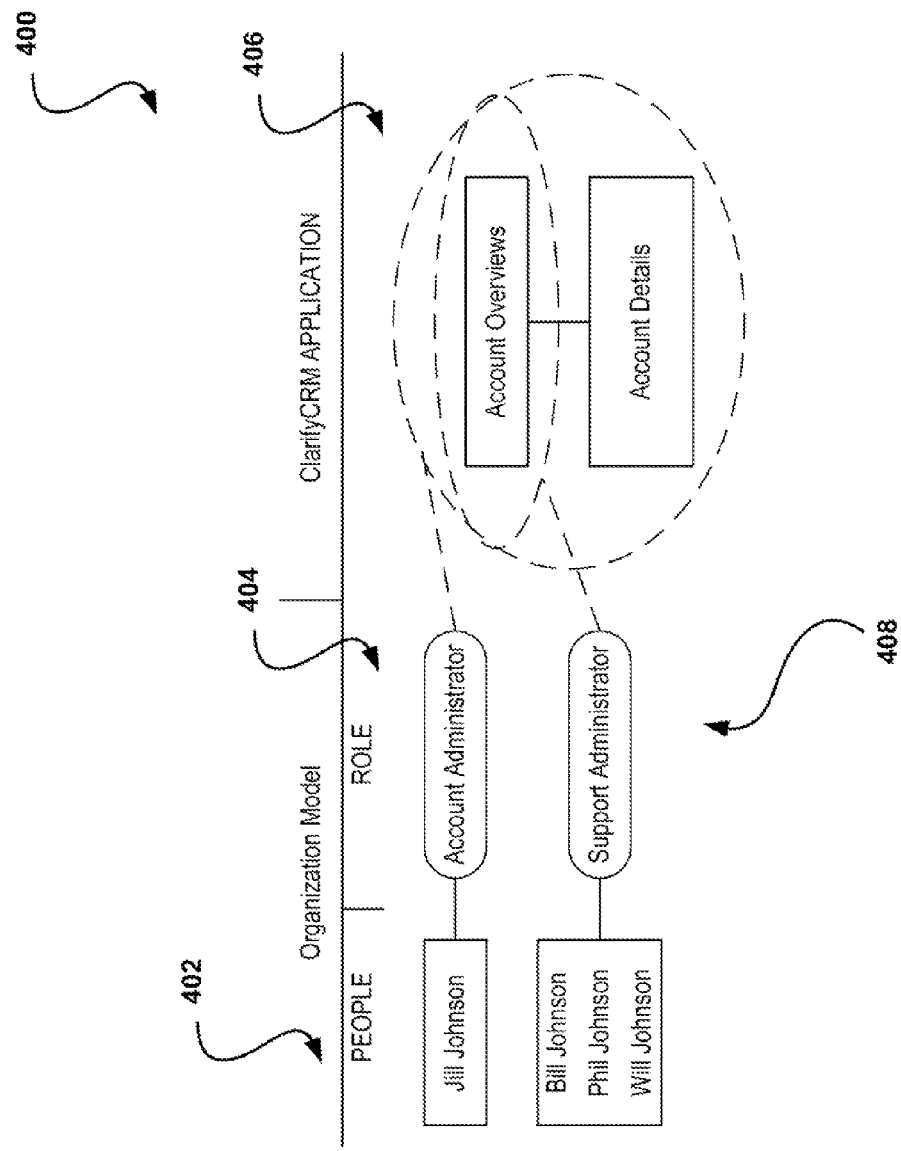
FIG. 4 shows a system for global role based authorization in the context of a customer relationship management (CRM) application, in accordance with another embodiment.

FIG. 4 shows a system 400 for global role based authorization in the context of a CRM application, in accordance with one embodiment. As an option, the present system 400 may be implemented in the context of the architecture and environment of FIGS. 1-3. Of course, however, the system 300 may be carried out in any desired environment. Further, the foregoing definitions may equally apply in the present description.

In present embodiment, the aforementioned framework may be used to tailor user access to various CRM application resources 406 based on a particular enterprise structure, without necessarily requiring the application resources 406 to be customized. As a first step in utilizing the framework, various CRM application resources 406 (e.g. see, for example, the resources 304 of FIG. 3, etc.) may be specified, to which access is to be controlled. For example, the CRM application resources 406 that are not to be accessed and/or used would not be specified.

As mentioned earlier, the resources 406 may include computer functions and/or data (e.g. software, etc.), as well as any hardware or components thereof. Of course, such functions may include any type of functionality and may or may not involve data associated with an associated application.

For example, user interface functionality may be controlled. Thus, a user may selectively enable and disable, or show and hide, various types of user interface controls such as buttons, menu items, text boxes, tabs, content of a drop down list, etc. In addition, one may also automatically filter the data shown as a result of a search. To this end, the same user may sometimes see different user interface controls on the same page, as different data is processed, accessed, etc.

As an additional initial step, various roles 404 (e.g. see, for example, the roles 302 of FIG. 3, etc.) may be specified, to mimic an organizational structure (e.g. enterprise organization, etc.), and users assigned to one or several roles. One or more of the roles 404 may, in turn, be linked to a selected one or more of the CRM application resources 406, in the manner shown. Table 1 below illustrates a similar relationship in the form of an authorization matrix.

TABLE 1

| Account Application: | Roles: | |
| --- | --- | --- |
| | Account Administrator | Support Administrator |
| Account Overviews | X | X |
| Account Details | X | |

Thus, as shown, four employees are organized into two roles, Account Administrator and Support Administrator. Further, the Account Administrator role is authorized to work on everything related to Accounts, while the Support Administrator role is authorized to work only on Account Overviews.

Of course, any data and/or functionality associated with the application may be listed on the left hand side of the above matrix of Table 1 and any roles may be listed in the upper end thereof. Still yet, while not shown, it should be noted that the data and/or functionality associated with the application may also be grouped (e.g. globally, etc.).

As mentioned previously, the aforementioned access control may be carried out reactively or proactively. Proactive control may, for example, involve disabling or hiding a user interface control when an application page is displayed based on the roles of the user. Thus, proactive control may be invoked when a page is displayed.

On the other hand, reactive control, instead of disabling the abovementioned user interface control on a page when the page is displayed, may perform authorization validation when users try to invoke controlled functionality. Reactive control may be invoked on the server, and may be performed for controls that involve sending data to a server even if proactive control is in effect.

Figure 5:
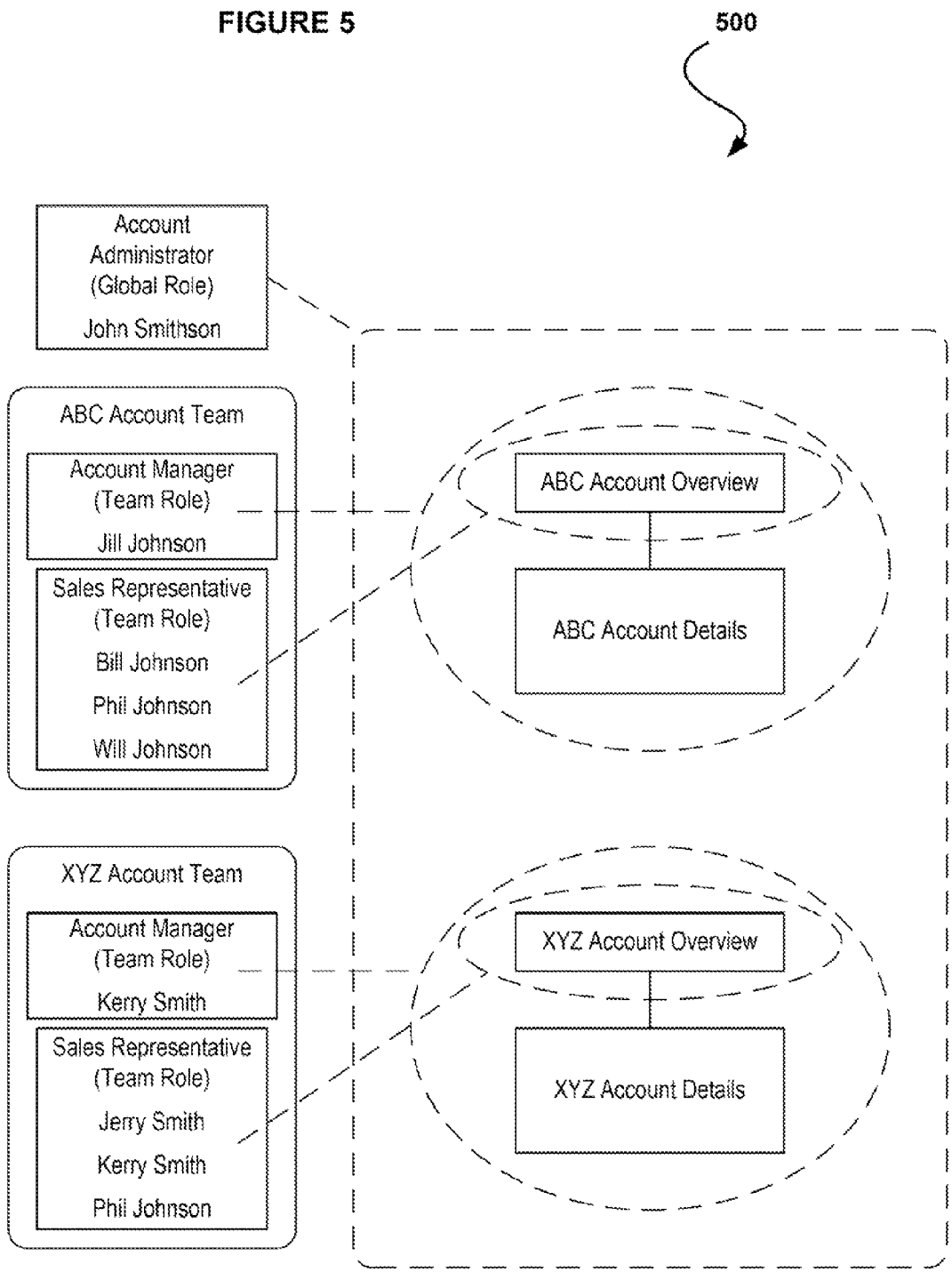
FIG. 5 shows another system for team role based authorization in the context of a CRM application, in accordance with another embodiment incorporating team roles.

FIG. 5 shows another system 500 for team role based authorization in the context of a CRM application, in accordance with another embodiment incorporating teams. As an option, the present system 500 may be implemented in the context of the architecture and environment of FIGS. 1-3. Of course, however, the system 500 may be carried out in any desired environment.

As shown, team roles may be used to authorize access to a specific domain on which a selected group of people can work. For example, for sales operations, teams of people may be defined for being assigned to work with particular accounts, within particular territories, and/or on specific opportunities. While teams are shown to be assigned in FIG. 5, there may optionally be functional teams and generic teams, as well. A functional team may, for example, include a grouping of people with specified roles, and a generic team may include a simple grouping of people, with no designated roles.

Table 2 below illustrates the use of the team roles shown in FIG. 5 in the form of a team authorization matrix.

TABLE 2

| Account Application: | Team Roles: | |
| --- | --- | --- |
| | Account Manager | Sales Representative |
| Account Overview | X | X |
| Account Details | X | |

Thus, as shown, eight employees are organized into two team roles, Account Manager and Sales Representative. Further, the Account Manager team role is authorized to work on everything related to Accounts to which the team is assigned, while the Sales Representative team role is authorized to work only on Account Overviews for those Accounts to which the team is assigned. The team authorization matrix specifies authorization generically. However, because individual users are assigned to one or more team roles on specific teams that are assigned to specific Accounts, these users inherit permissions thereby.

It should also be noted that membership in a team role may also confer authorization to perform operations on other entities in the application, that are related to these Accounts. The relationship is specified through the use of an authorization path, which delineates the connection between the aforementioned entity and the authorization domain object (Account in this example).

For example, opportunity database entities may be related to each Account, and the relationship specified via the authorization path. Once so specified, operations on opportunity entities that are related to the team Account can be authorized for specific Account Team Roles. Be it also noted that hierarchical, recursive relationships, such as parent-child relationships between Accounts, may also be specified by the authorization path, such that permissions for operations on child Accounts may also be defined in the team authorization matrix. Furthermore, such relationships can be combined in any manner via the use of the authorization path.

Figure 6:
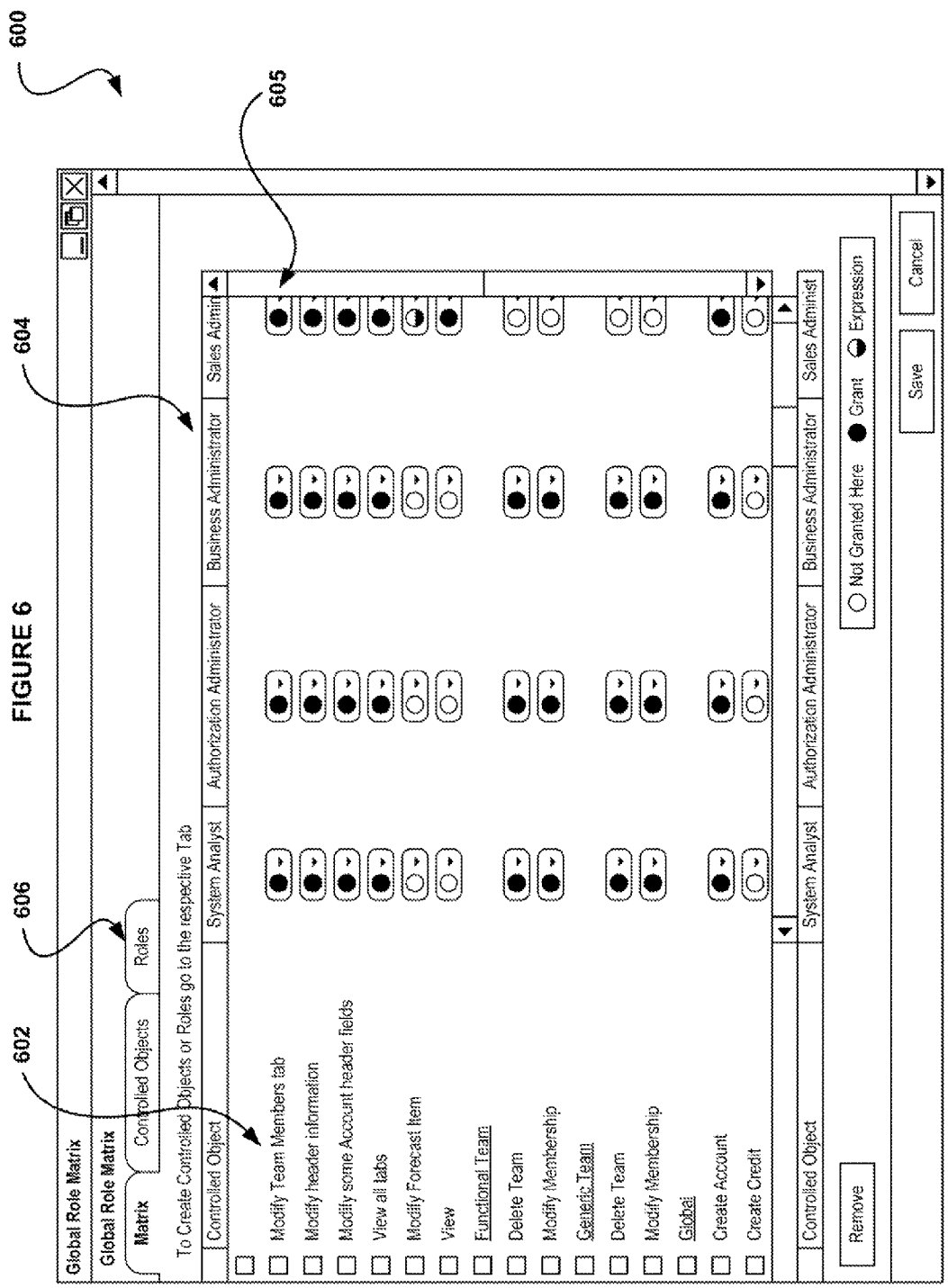
FIG. 6 shows a graphical user interface for generating a global authorization matrix, in accordance with another embodiment.

FIG. 6 shows a graphical user interface 600 for generating a global authorization matrix, in accordance with another embodiment. As an option, the present graphical user interface 600 may be implemented in the context of the architecture and environment of FIGS. 1-5. Of course, however, the graphical user interface 600 may be carried out in any desired environment.

As shown, the graphical user interface 600 is adapted for generating a global authorization matrix for selecting authorization conditions (or lack thereof) for a plurality of computer functions and/or data (e.g. controlled objects 602, etc.) with respect to a plurality of roles 604. This may be accomplished by using a plurality of icons 605 for either granting unconditional access, conditional access using an expression, or unconditionally not granting access. It should be noted that additional tabs 606 may be provided for providing access to, defining, and/or editing the various roles and resources.

Figure 7:
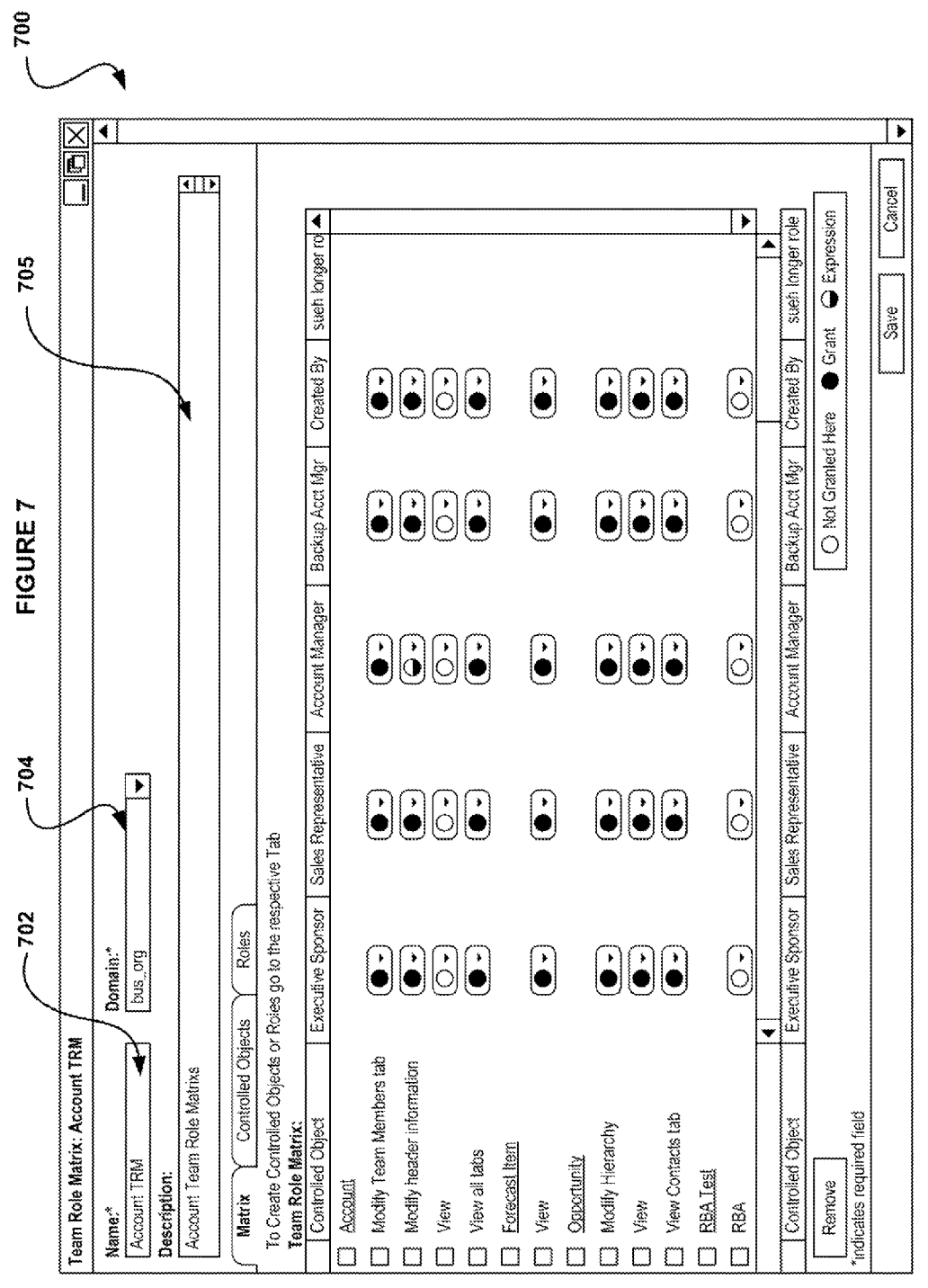

FIG. 7 shows a graphical user interface 700 for generating a team authorization matrix, in accordance with another embodiment. Such interface 700 is similar to the interface 600 of FIG. 6, with the exception of a name identifying field 702, a domain identifying field 704, and a description field 706.

It should be noted that if a user has multiple roles on the same team, the effective permission may be the sum of all the permissions granted for that user in that team. Further, while not shown, a similar interface may be provided for generating a user authorization matrix.

Table 2 below illustrates various optional optimizations that may be employed in the context of the above embodiments. Of course, such optimizations are to be considered illustrative in nature, and in no way limiting.

TABLE 3

Use global roles if possible
Define as few resources (e.g. functions, etc.) as possible (if two functions are defined using exactly the same authorization path, combine the two functions)
Control the main function rather than the main functions in addition to secondary functions (if a business function can be accessed only by TABLE 3-continued traversing through an already-controlled function, do not specifically control the second)
Define as few team roles as needed
Do not duplicate permissions when one role is a superset of another role
Define the authorization path and the user role path with as few relations as possible in the path.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A system, comprising:
a hardware processor; and
memory storing a plurality of computer executable resources associated with a first authorization domain, the first authorization domain being one of a plurality of root entity data objects of an application and including at least one of an account, a territory, and an opportunity, and which derives protection via control of access to the resources, and
the memory further storing a plurality of computer implementable roles associated with the first authorization domain;
wherein the hardware processor is configured such that access to the resources is controlled utilizing expressions that operate as a function of the roles and the resources;
wherein the hardware processor is configured such that the expressions operate as a function of run-time data;
wherein the hardware processor is configured such that query code is generated using the first authorization domain and the expressions;
wherein the hardware processor is configured such that the expressions are used at run-time to dynamically generate an optimized query;
wherein the hardware processor is configured such that authorization via one of the expressions for a particular one of the roles to access a particular one of the resources associated with the first authorization domain automatically confers authorization for the particular one of the roles to access resources of at least one second authorization domain of the application related to the first authorization domain, the at least one second authorization domain of the application related to the first authorization domain via a hierarchical relationship;
wherein the resources are linked to the first authorization domain utilizing an authorization path;
wherein the resources are associated with a customer relationship management (CRM) application;
wherein the query code generation utilizes dynamic relational information in a customer database of the CRM application.

2. The system of claim 1, wherein the roles include user roles assigned to users.

3. The system of claim 1, wherein the roles include team roles assigned to teams.

4. The system of claim 1, wherein the roles include global roles assigned on a global basis.

5. The system of claim 1, wherein the expressions are user-configurable.

6. The system of claim 5, wherein the expressions are user-configurable utilizing a graphical user interface.

7. The system of claim 1, wherein the expressions are reusable.

8. The system of claim 7, wherein the expressions are reusable by naming the expressions such that they are capable of being reused with different resources, authorization domains, and other expressions.

9. The system of claim 1, wherein the expressions are updateable.

10. The system of claim 1, wherein the expressions are updateable in real-time.

11. The system of claim 1, wherein the control is performed reactively.

12. The system of claim 1, wherein the control is performed proactively.

13. The system of claim 1, wherein the control is instantaneous.

14. The system of claim 1, wherein the expressions include conditions under which access to the resources is allowed.

15. The system of claim 14, wherein the conditions under which access to the resources is allowed include an arithmetic expression that operates as a function of at least one of a name and a parameter associated with the resources.

16. The system of claim 14, wherein the conditions under which access to the resources is allowed include a boolean expression that operates as a function of at least one of a name and a parameter associated with the resources.

17. The system of claim 1, wherein access to the resources is tailored based on an organization structure without requiring customization of the resources.

18. A method, comprising:
defining a plurality of roles associated with a first authorization domain;
linking, utilizing a hardware processor, the first authorization domain with a plurality of resources, the first authorization domain being one of a plurality of root entity data objects of an application and including at least one of an account, a territory, and an opportunity, and which derives protection via control of access to the resources; and
controlling access to the resources utilizing expressions that operate as a function of the roles and the resources, utilizing the hardware processor;
wherein the expressions operate as a function of run-time data;
wherein query code is generated using the first authorization domain and the expressions;
wherein the expressions are used at run-time to dynamically generate an optimized query;
wherein authorization via one of the expressions for a particular one of the roles to access a particular one of the resources associated with the first authorization domain automatically confers authorization for the particular one of the roles to access resources of at least one second authorization domain of the application related to the first authorization domain, the at least one second authorization domain of the application related to the first authorization domain via a hierarchical relationship;
wherein the resources are linked to the first authorization domain utilizing an authorization path;
wherein the resources are associated with a customer relationship management (CRM) application;

wherein the query code generation utilizes dynamic relational information in a customer database of the CRM application.

19. A computer program product embodied on a non-transitory computer readable storage medium, comprising:
 a data structure for representing a plurality of resources and roles associated with a first authorization domain, the first authorization domain being one of a plurality of root entity data objects of an application and including at least one of an account, a territory, and an opportunity, and which derives protection via control of access to the resources; and
 computer code for controlling access to the resources utilizing expressions that operate as a function of the roles and the resources;
 wherein the computer program product is configured such that the expressions operate as a function of run-time data;
 wherein the computer program product is configured such that query code is generated using the first authorization domain and the expressions;
 wherein the computer program product is configured such that the expressions are used at run-time to dynamically generate an optimized query;
 wherein the computer program product is configured such that authorization via one of the expressions for a particular one of the roles to access a particular one of the resources associated with the first authorization domain automatically confers authorization for the particular one of the roles to access resources of at least one second authorization domain of the application related to the first authorization domain, the at least one second authorization domain of the application related to the first authorization domain via a hierarchical relationship;
 wherein the resources are linked to the first authorization domain utilizing an authorization path;
 wherein the resources are associated with a customer relationship management (CRM) application;
 wherein the query code generation utilizes dynamic relational information in a customer database of the CRM application.

20. The system of claim 1, wherein the authorization path includes a data structure that links the resources to the first authorization domain for establishing a relationship between the resources, the roles, and the first authorization domain.

* * * * *